United States Patent
Sato et al.

(10) Patent No.: US 9,889,629 B2
(45) Date of Patent: Feb. 13, 2018

(54) ELECTRONIC DEVICE MANUFACTURING METHOD AND ELECTRONIC DEVICE

(71) Applicant: SEIKO EPSON CORPORATION, Tokyo (JP)

(72) Inventors: Naoya Sato, Chino (JP); Masashi Yoshiike, Chino (JP)

(73) Assignee: Seiko Epson Corporation, Tokyo (JP)

( * ) Notice: Subject to any disclaimer, the term of this patent is extended or adjusted under 35 U.S.C. 154(b) by 57 days.

(21) Appl. No.: 15/003,612

(22) Filed: Jan. 21, 2016

(65) Prior Publication Data

US 2016/0257101 A1    Sep. 8, 2016

(30) Foreign Application Priority Data

Mar. 6, 2015    (JP) .................. 2015-044207

(51) Int. Cl.

| | |
|---|---|
| *B32B 3/02* | (2006.01) |
| *B32B 7/12* | (2006.01) |
| *B32B 37/12* | (2006.01) |
| *B32B 7/14* | (2006.01) |
| *B32B 15/02* | (2006.01) |
| *B32B 15/08* | (2006.01) |
| *B32B 15/18* | (2006.01) |
| *B32B 27/08* | (2006.01) |
| *B32B 27/28* | (2006.01) |
| *B32B 3/26* | (2006.01) |
| *G02B 5/00* | (2006.01) |

(52) U.S. Cl.
CPC .................. *B32B 7/12* (2013.01); *B32B 3/26* (2013.01); *B32B 7/14* (2013.01); *B32B 15/02* (2013.01); *B32B 15/08* (2013.01); *B32B 15/18* (2013.01); *B32B 27/08* (2013.01); *B32B 27/283* (2013.01); *B32B 37/1292* (2013.01); *G02B 5/00* (2013.01); *B32B 2037/1253* (2013.01); *B32B 2255/10* (2013.01); *B32B 2255/20* (2013.01); *B32B 2255/26* (2013.01); *B32B 2307/546* (2013.01); *B32B 2307/704* (2013.01); *B32B 2457/00* (2013.01); *B32B 2457/20* (2013.01)

(58) Field of Classification Search
CPC ........... B32B 7/12; B32B 15/02; B32B 15/08; B32B 15/18; B32B 27/08; B32B 27/283; B32B 3/26; B32B 2307/1253; B32B 2307/546; B32B 2307/704; B32B 2457/00; B32B 2457/20; B32B 2255/10; B32B 2255/20
See application file for complete search history.

(56) References Cited

U.S. PATENT DOCUMENTS

2005/0239233 A1\* 10/2005 Shinkai ................ B41J 2/14209
                                                                      438/106
2016/0257093 A1\* 9/2016 Yoshiike .................. B32B 7/12

FOREIGN PATENT DOCUMENTS

JP       2007-158231       6/2007

\* cited by examiner

*Primary Examiner* — Elizabeth E Mulvaney
(74) *Attorney, Agent, or Firm* — Workman Nydegger (57) ABSTRACT

An electronic device is manufactured by a method including applying a photosensitive adhesive agent either to a pressure chamber forming substrate and a vibrating plate or to a sealing plate having a structure of a lower height from a bonding surface, precuring the photosensitive adhesive agent by heating, patterning the precured photosensitive adhesive agent, and bonding the substrates together with the structure (bump electrode) and the photosensitive adhesive agent interposed therebetween.

2 Claims, 6 Drawing Sheets

ELECTRONIC DEVICE MANUFACTURING METHOD AND ELECTRONIC DEVICE

The entire disclosure of Japanese Patent Application No: 2015-044207, filed Mar. 6, 2015 is expressly incorporated by reference herein in its entirety.

BACKGROUND

1. Technical Field

The present invention relates to a manufacturing method of an electronic device including a drive element that deforms a driving region, and to the electronic device.

2. Related Art

The electronic device herein refers to a device including a drive element such as a piezoelectric element that deforms with a voltage applied thereto, and is widely used for various devices and sensors. In a liquid ejecting apparatus for example, the electronic device is utilized in a liquid ejecting head that ejects various types of liquids. Although the liquid ejecting apparatus can be typically exemplified by an image recording apparatus such as an ink jet printer or an ink jet plotter, in recent years the electronic device has come to be employed in various manufacturing apparatuses, because of its advantage in that a minute amount of liquid can be accurately ejected onto a predetermined position. Examples of such manufacturing apparatuses include a display manufacturing apparatus for manufacturing color filters for liquid crystal displays, an electrode forming apparatus for manufacturing electrodes for organic electro luminescence (EL) displays and field emission displays (FED), and a chip manufacturing apparatus for manufacturing biochips. In the recording head of the image recording apparatus, the electronic device is utilized for ejecting a liquid ink, and in a color material ejecting head of the display manufacturing apparatus the electronic device is utilized for ejecting the color material solutions of red (R), green (G), and blue (B). In an electrode material ejecting head of the electrode forming apparatus, the electronic device is utilized for ejecting an electrode material of a liquid phase, and in a bioorganic substance ejecting head of the chip manufacturing apparatus the electronic device is utilized for ejecting a bioorganic substance solution.

The mentioned liquid ejecting heads include the electronic device composed of stacked layers of a pressure chamber forming substrate in which a pressure chamber communicating with nozzles is formed, a piezoelectric element (a kind of drive element) that generates pressure fluctuation in the liquid in the pressure chamber, and a sealing plate (also called cover substrate, as the case may be) disposed with a spacing from the piezoelectric element. In recent years, a technique of providing the drive circuit associated with the piezoelectric element in the sealing plate has been developed. Further, a device composed of substrates, each including a certain structure such as the drive element and associated circuits and wirings, coupled to each other with the structure located therebetween, via an adhesive agent (adhesive resin) constituted of a photosensitive resin (see, for example, JP-A-2007-158231). According to JP-A-2007-158231, the adhesive agent is applied to the surface of the substrate on which the structure is provided, and the other substrate is bonded thereon.

Figure 6A:
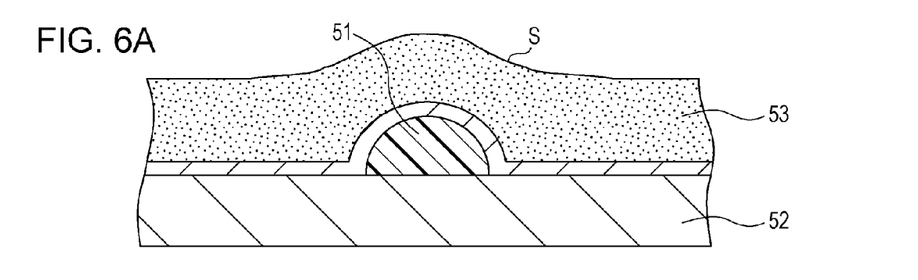
FIGS. 6A to 6D are schematic cross-sectional views for explaining a conventional manufacturing process of an electronic device.
Figure 6B:
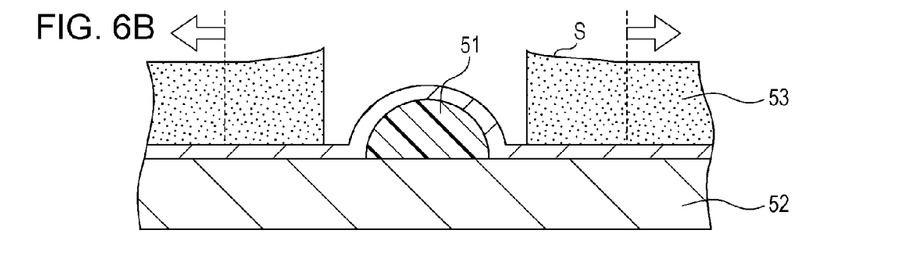
Figure 6C:
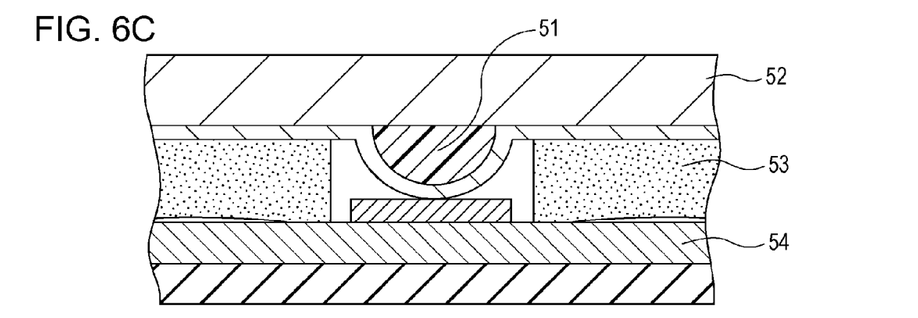
Figure 6D:
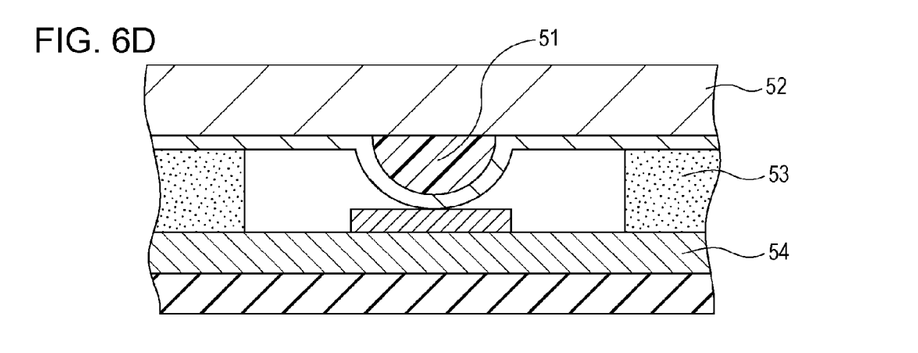

FIGS. 6A to 6D are schematic cross-sectional views for explaining the conventional bonding process of the substrates. Referring to FIG. 6A, when a photosensitive adhesive agent 53 is applied to a first substrate 52 having a structure 51 (bump electrode) so as to cover the structure 51, a sloped portion (slope S) is formed on the layer of the photosensitive adhesive agent 53 which has been applied, from a position corresponding to the structure 51 to a position where the structure 51 is not located. In other words, the photosensitive adhesive agent 53 on the structure 51 protrudes in a hill shape. The photosensitive adhesive agent 53 is then precured by heating, exposed, and developed so as to be patterned in a predetermined shape as shown in FIG. 6B. Accordingly, in the case where the adhesive agent remains close to the structure after the patterning, the adhesive agent is cured maintaining a part of the slope S, and therefore the adhesive agent is not easily elastically deformed when the substrates are pressed against each other in the bonding direction. Consequently, a sufficient bonding area of the photosensitive adhesive agent 53 is unable to be secured when the substrates are bonded to each other as shown in FIG. 6C, which may degrade the bonding reliability. As a solution to the above, a portion of the adhesive agent other than the slope S may be patterned. In this case, however, flat portions of the adhesive agent on the outer side of broken lines in FIG. 6B are utilized for bonding, and therefore the adhesive agent is located distant from the structure 51 as shown in FIG. 6D, which impedes the electronic device from being made smaller and finer in size.

SUMMARY

An advantage of some aspects of the present invention is provision of an electronic device manufacturing method that enables bonding reliability to be secured while allowing reduction in size of the electronic device, and the electronic device thus manufactured.

In a first aspect, the present invention provides a manufacturing method of an electronic device that includes a first substrate including a flexurally deformable driving region and a drive element disposed in the driving region so as to deform the driving region, and a second substrate opposed to the first substrate with a spacing from the first substrate and with the drive element and other structure of the first substrate interposed between the first and second substrates, the first and second substrates being bonded via a thermosetting adhesive agent. The manufacturing method includes applying the adhesive agent to a bonding surface of one of the first substrate and the second substrate that, on an assumption that the adhesive agent is applied to the both substrates so as to cover a structure formed on the respective bonding surfaces, makes a distance of a slope from a top portion of the adhesive agent covering the structure to an edge of a flat region of the adhesive agent shorter, and bonding the first substrate and the second substrate together, with the structure and the adhesive agent interposed between the first and second substrates.

The manufacturing method according to the first aspect suppresses formation of the slope on the surface of the photosensitive adhesive agent applied to the substrate. Accordingly, the adhesive agent can be located as close as possible to the structure, and therefore a higher degree of designing freedom can be attained so as to arrange the structure and the adhesive agent with a higher density. Consequently, the electronic device can be manufactured in a smaller size. In addition, for example in the case of cutting out chips respectively corresponding to a plurality of electronic devices from a silicon monocrystalline substrate, the size per chip is reduced so that an increased number of chips can be obtained from the silicon monocrystalline substrate. Therefore, the cost per electronic device can also be reduced. Further, the bonding reliability of the adhesive agent is improved and therefore the quality of the electronic device is stabilized, which leads to a higher yield.

In a second aspect, the manufacturing method according to the first aspect may preferably include a patterning process including providing the adhesive agent on respective sides of a region where a structure having a highest height between the first substrate and the second substrate is located.

The manufacturing method according to the second aspect suppresses formation of the slope on the surface of the adhesive agent even in a region where the structure having the highest height is to be located. Accordingly, the adhesive agent can be located as close as possible to the position where the highest structure is to be provided, and therefore an even higher degree of designing freedom can be attained, and a further reduction in size can be expected.

In a third aspect, the present invention provides an electronic device manufactured through the manufacturing method according to the first or second aspect.

The third aspect provides the electronic device that is smaller in size and higher in reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, embodiments of the present invention will be described with reference to the drawings. Although some limitations will be made as preferred examples of the present invention, it should be understood that such limitations are not intended to limit the scope of the present invention, unless otherwise expressly noted. Hereunder, an ink jet printer (hereinafter, printer) will be taken up as subject of the description, as an example of a liquid ejecting apparatus having an ink jet recording head (hereinafter, recording head) exemplifying a liquid ejecting head including the electronic device according to the present invention.

Figure 1:
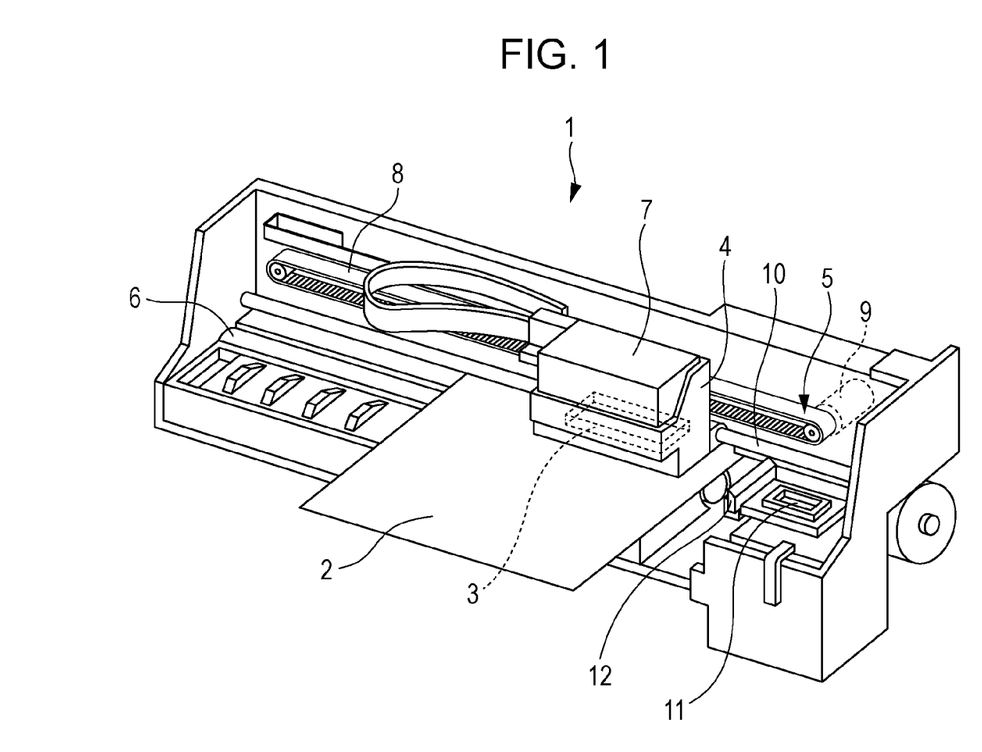
FIG. 1 is a perspective view for explaining a configuration of a printer.

Referring to FIG. 1, the configuration of the printer 1 will be described. The printer 1 serves to eject an ink (an example of the liquid) onto a surface of a recording medium 2 such as a recording sheet, to thereby record an image and characters. The printer 1 includes a recording head 3, a carriage 4 on which the recording head 3 is mounted, a carriage moving mechanism 5 that moves the carriage 4 in a main scanning direction, and a transport mechanism 6 that transports the recording medium 2 in a sub scanning direction. The ink is stored in an ink cartridge 7 serving as liquid supply source. The ink cartridge 7 is removably attached to the recording head 3. Here, the ink cartridge may be provided in the main body of the printer, so as to supply the ink from the ink cartridge to the recording head through an ink supply tube.

The carriage moving mechanism 5 includes a timing belt 8, which is driven by a pulse motor 9, for example a DC motor. When the pulse motor 9 is activated, the carriage 4 is caused to reciprocate in the main scanning direction (width direction of the recording medium 2), along a guide rod 10 spanned in the printer 1. The position of the carriage 4 in the main scanning direction is detected by a non-illustrated linear encoder. The linear encoder transmits the detection signal, in other words the encoder pulse to a control unit of the printer 1.

A home position, which is an initial position of the scanning movement of the carriage 4, is provided in an end portion of the stroke range of the carriage 4 outside of the recording region. In the home position, a cap 11 that closes nozzles 22 formed on a nozzle face (nozzle plate) 21 of the recording head 3, and a wiping unit 12 that wipes the nozzle face are provided in this order from the farther end portion.

Figure 2:
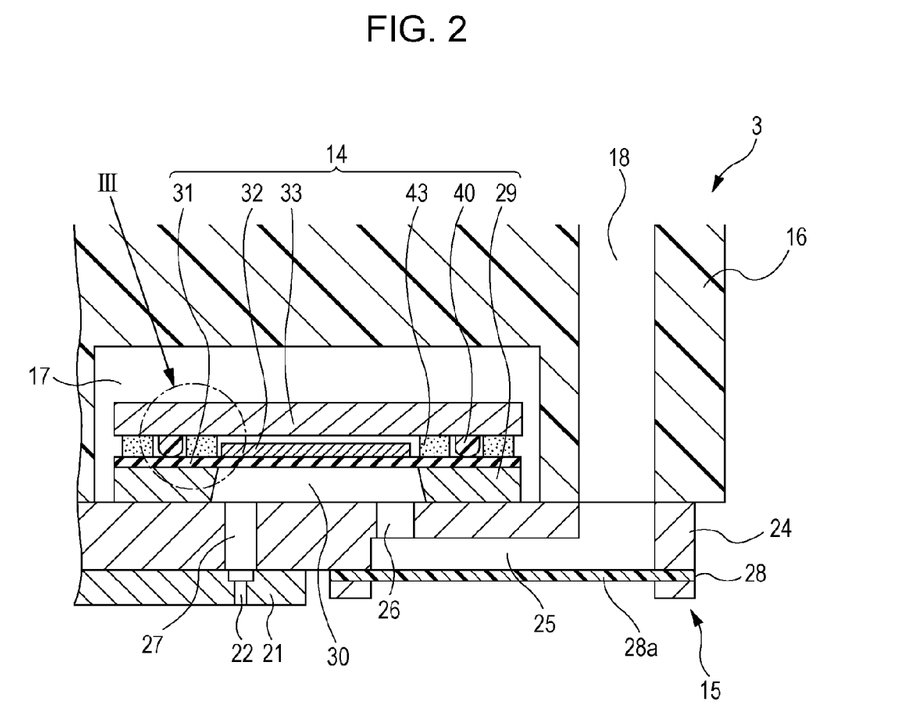
FIG. 2 is a cross-sectional view for explaining a configuration of a recording head.
Figure 3:
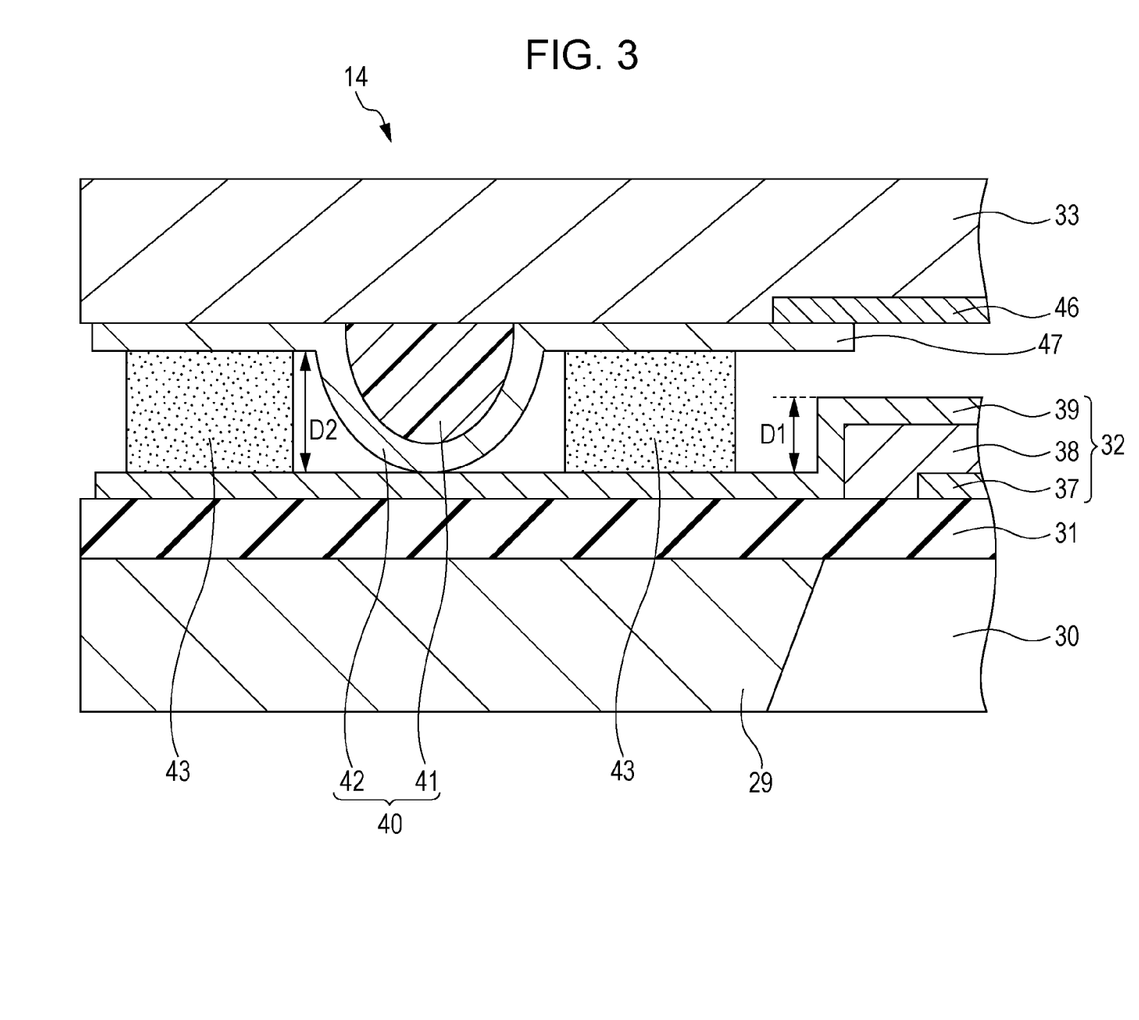
FIG. 3 is an enlarged cross-sectional view of a portion indicated by III in FIG. 2.

The recording head 3 will now be described. FIG. 2 is a cross-sectional view for explaining a configuration of the recording head 3. FIG. 3 is an enlarged cross-sectional view of a portion indicated by III in FIG. 2, and illustrates an essential part of an electronic device 14 incorporated in the recording head 3. The recording head 3 according to this embodiment includes, as shown in FIG. 2, a flow path unit 15 on which the electronic device 14 is stacked, and is fixed in a head case 16. For the sake of convenience, the direction in which the components are stacked will hereafter be referred to as up-and-down direction.

The head case 16 is a box-shaped member formed of a synthetic resin, and includes a first reservoir 18 from which the ink is supplied to each pressure chamber 30. The first reservoir 18 serves to store the ink to be commonly supplied to a plurality of pressure chambers 30, and is formed along the direction of the nozzle row. Though not shown, an ink introduction path through which the ink from the ink cartridge 7 is introduced into the first reservoir 18 is provided above the head case 16. In addition, the head case 16 includes an accommodation cavity 17 formed in the lower portion so as to recede in a rectangular block shape from the lower face of the head case 16 to halfway in the height direction thereof. When the flow path unit 15 to be subsequently described is joined to a predetermined position of the lower face of the head case 16, the electronic device 14 (pressure chamber forming substrate 29, sealing plate 33, and so forth) stacked on a communicating substrate 24 is located inside the accommodation cavity 17.

The flow path unit 15 joined to the lower face of the head case 16 includes the communicating substrate 24, the nozzle plate 21 and a compliance substrate 28. In this embodiment, the communicating substrate 24 is formed of a silicon monocrystalline substrate. The communicating substrate 24 includes, as shown in FIG. 2, a second reservoir 25 communicating with the first reservoir 18 so as to store the ink to be commonly supplied to each of the pressure chambers 30, and an individual communication path 26 through which the ink in the second reservoir 25 supplied from the first reservoir 18 is individually supplied to each pressure chamber 30, the second reservoir 25 and the individual communication path 26 being formed by etching. The second reservoir 25 is an elongate cavity extending in the direction of the nozzle row (direction in which the pressure chambers 30 are aligned). Thus, a plurality of the individual communication paths 26 are provided in the direction in which the pressure chambers 30 are aligned, so as to correspond to the respective pressure chambers 30. The individual communication path 26 communicates with an end portion of the corresponding pressure chamber 30 in the longitudinal direction, when the communicating substrate 24 and the pressure chamber forming substrate 29 are joined to each other.

The communicating substrate 24 includes nozzle communication paths 27 formed so as to penetrate through the communicating substrate 24 in the thickness direction, at positions corresponding to the respective nozzles 22. In other words, a plurality of the nozzle communication paths 27 are aligned in the direction of the nozzle row, so as to correspond to the respective nozzles. The pressure chamber 30 communicates with the nozzle 22 through the nozzle communication path 27. In this embodiment, the nozzle communication path 27 communicates with the other end portion of the pressure chamber 30 in the longitudinal direction (opposite side of the individual communication path 26), when the communicating substrate 24 and the pressure chamber forming substrate 29 are joined to each other.

The nozzle plate 21 is a substrate formed of silicon or stainless steel, and joined to the lower face of the communicating substrate 24 (opposite side of the pressure chamber forming substrate 29). In this embodiment, the nozzle plate 21 is located in a region of the communicating substrate 24 deviated from the compliance substrate 28 (second reservoir 25). The nozzle plate 21 includes the plurality of nozzles 22 aligned in a row. The plurality of nozzles 22 (nozzle row) are aligned, from the nozzle 22 at an end of the row to the nozzle 22 at the other end of the row, in the sub scanning direction orthogonal to the main scanning direction, at a pitch corresponding to the dot forming density.

The compliance substrate 28 is provided in a region of the communicating substrate 24 corresponding to the second reservoir 25, which is deviated from the region where the nozzle plate 21 is located, so as to close the lower opening of the space that serves as the second reservoir 25. The compliance substrate 28 serves to absorb pressure fluctuation generated in the ink in the reservoirs 18 and 25, with a compliance portion 28a which is a flexible surface.

In this embodiment, the electronic device 14 includes thin plate-shaped members stacked on each other, so as to act as actuator that generates pressure fluctuation in the ink in each pressure chamber 30. As shown in FIG. 2, the electronic device 14 is a unit including the pressure chamber forming substrate 29, a vibrating plate 31, a piezoelectric element 32, and a sealing plate 33 which are sequentially stacked. The electronic device 14 is smaller in size than the accommodation cavity 17, so as to be accommodated therein.

In this embodiment, the pressure chamber forming substrate 29 is formed of a silicon monocrystalline substrate. The pressure chamber forming substrate 29 includes a space that is to serve as the pressure chamber 30, formed by removing a portion of the pressure chamber forming substrate 29 throughout the entire thickness by etching. A plurality of such spaces, in other words the pressure chambers 30 are provided so as to correspond to the respective nozzles 22. Each of the pressure chambers 30 is an elongate cavity extending in the direction orthogonal to the direction of the nozzle row, and formed so as to communicate with the individual communication path 26 at an end portion in the longitudinal direction and with the nozzle communication path 27 at the other end portion.

The vibrating plate 31 is an elastic thin-film member, and stacked on the upper face of the pressure chamber forming substrate 29 (opposite side of the communicating substrate 24). The vibrating plate 31 serves to close the upper opening of the space that is to serve as the pressure chamber 30. In other words, the vibrating plate 31 defines the pressure chamber 30. The portion of the vibrating plate 31 corresponding to the pressure chamber 30 (more strictly, the upper opening of the pressure chamber 30) serves as displacement portion to be displaced away from or toward the nozzle 22, by the flexural deformation of the piezoelectric element 32. Thus, the region of the vibrating plate 31 corresponding to the upper opening of the pressure chamber 30 serves as the driving region that is flexurally deformable. In contrast, the region of the vibrating plate 31 deviated from the upper opening of the pressure chamber 30 corresponds to the non-driving region restricted from being flexurally deformed.

The vibrating plate 31 includes, for example, an elastic film of silicon dioxide ($SiO_2$) formed over the upper face of the pressure chamber forming substrate 29, and an insulating film of zirconium oxide ($ZrO_2$) formed over the elastic film. The piezoelectric element 32 is stacked on the insulating film (surface of the vibrating plate 31 opposite to the pressure chamber forming substrate 29) in the region corresponding to the pressure chamber 30, in other words in the driving region. Here, the pressure chamber forming substrate 29 and the vibrating plate 31 stacked thereon correspond to the first substrate in the present invention. In addition, the surface of the vibrating plate 31 on which the piezoelectric element 32 is provided serves as the bonding surface to which the sealing plate 33 is bonded.

In this embodiment, the piezoelectric element 32 is a deflection-vibration type piezoelectric element. As shown in FIG. 3, the piezoelectric element 32 includes, for example, a lower electrode layer 37, a piezoelectric layer 38, and an upper electrode layer 39 sequentially stacked on the vibrating plate 31. In this embodiment, the lower electrode layer 37 serves as individual electrode for each piezoelectric element 32, and the upper electrode layer 39 serves as common electrode for all the piezoelectric elements 32. The function of the lower electrode layer 37 and the upper electrode layer 39 may be reversed, depending on the configuration of the drive circuit or routing of the wiring. The piezoelectric element 32 thus configured is flexurally deformed in the direction away from or toward the nozzle 22, when an electric field corresponding to the potential difference between the lower electrode layer 37 and the upper electrode layer 39 is applied. As shown in FIG. 3, an end portion of the upper electrode layer 39 on the left extends beyond the upper opening edge of the pressure chamber 30 and as far as the region of the vibrating plate 31 corresponding to the non-driving region. Likewise, though not shown, an end portion of the lower electrode layer 37 on the right in FIG. 3 extends beyond the upper opening edge of the pressure chamber 30 and as far as the region of the vibrating plate 31 corresponding to the non-driving region opposite to the non-driving region where the upper electrode layer 39 is provided. Thus, the lower electrode layer 37 extends as far as the non-driving region on one side and the upper electrode layer 39 extends as far as the non-driving region on the other side, in the longitudinal direction of the pressure chamber 30. The extended portions of the lower electrode layer 37 and the upper electrode layer 39 are electrically connected to respectively corresponding bump electrode 40. Here, the piezoelectric element 32 formed on the bonding surface of the vibrating plate 31 and the lower electrode layer 37 formed on the non-driving region correspond to the structure in the present invention. The bump electrode 40, which is also the structure on the side of the sealing plate 33, will be subsequently described.

The sealing plate 33 (corresponding to the second substrate in the present invention) is a flat plate-shaped member formed of silicon. As shown in FIG. 3, the sealing plate 33 includes a drive circuit 46 that drives the piezoelectric element 32, located in the region of the sealing plate 33 opposing the piezoelectric element 32. The drive circuit 46 is formed on the surface of a silicon monocrystalline substrate to be formed into the sealing plate 33, through a semiconductor process (for example, film deposition, photolithography, and etching). In addition, a wiring layer 47 is formed on the surface of the drive circuit 46 on the side of the piezoelectric element 32, so as to be connected to the drive circuit 46 and exposed on the surface of the sealing plate 33 on the side of the vibrating plate 31, in other words the surface to be bonded to the vibrating plate 31. The wiring layer 47 is routed as far as the position outer than the drive circuit 46 and corresponding to the lower electrode layer 37 and the upper electrode layer 39 extending to the non-driving region. Although the wiring layer 47 is illustrated as a single line in FIG. 3, actually the wiring layer 47 is composed of a plurality of wirings. More specifically, a wiring layer for the individual electrode (lower electrode layer 37) of the piezoelectric element 32 and a wiring layer for the common electrode (upper electrode layer 39) of the piezoelectric element 32 are patterned on the surface of the sealing plate 33. Each of the wiring layers is electrically connected to a corresponding wiring terminal in the drive circuit 46.

The pressure chamber forming substrate 29 having the vibrating plate 31 and the piezoelectric element 32 stacked thereon and the sealing plate 33 are bonded together via a photosensitive adhesive agent 43, with the bump electrode 40 interposed therebetween. The bump electrode 40 serves for electrical connection between the drive circuit 46 and the individual electrode (lower electrode layer 37) of each piezoelectric element 32, as well as the common electrode (upper electrode layer 39), by contacting the lower electrode layer 37 and the upper electrode layer 39 extending as far as the non-driving region. The bump electrode 40 and the photosensitive adhesive agent 43 provided on the respective sides of the bump electrode 40 define a gap between the vibrating plate 31 and the sealing plate 33. The gap is formed in such a size that does not affect the flexural deformation of the piezoelectric element 32. The photosensitive adhesive agent 43 possesses photosensitivity and thermosetting property, and is located in the gap between the vibrating plate 31 and the sealing plate 33 so as to divide between the space including the driving region of the piezoelectric element 32 and an outer space. Examples of suitable materials of the photosensitive adhesive agent 43 include resins predominantly composed of, for example, an epoxy resin, an acrylic resin, a phenol resin, a polyimide resin, a silicone resin, and a styrene resin.

The bump electrode 40 includes an internal resin (resin core) 41 extending in a rib shape in the direction in which the pressure chambers are aligned (direction of nozzle row), and a conductive film 42 formed so as to partially cover the internal resin 41. The internal resin 41 is an elastic resin such as a polyimide resin, and formed in the region of the bonding surface of the sealing plate 33 opposing the non-driving region of the vibrating plate 31 where the lower electrode layer 37 is provided, and in the region opposing the non-driving region where the upper electrode layer 39 is provided. The conductive film 42 is a part of the wiring layer 47, and formed at the position corresponding to the lower electrode layer 37 (individual electrode). Thus, a plurality of conductive films 42 are provided along the direction of the nozzle row. Likewise, a plurality of conductive films 42 corresponding to the upper electrode layer 39 (common electrode) are provided along the direction of the nozzle row.

As shown in FIG. 3, the photosensitive adhesive agent 43 is provided on the respective sides of the bump electrode 40 in the direction orthogonal to the direction of the nozzle row, so as to extend in a belt shape in the direction of the nozzle row. In other words, the photosensitive adhesive agent 43 is patterned on one side and the other side of the bump electrode 40 in the direction orthogonal to the direction of the nozzle row. These portions of the photosensitive adhesive agent 43 are located as close as possible to the bump electrode 40, but so as not to contact the bump electrode 40.

Here, the components provided on the surface of the sealing plate 33 to be bonded to the vibrating plate 31, and on the surface of the vibrating plate 31 to be bonded to the sealing plate 33, correspond to the structure in the present invention. More specifically, the wiring layer 47 and the bump electrode 40 formed on the bonding surface of the sealing plate 33, and the piezoelectric element 32 (lower electrode layer 37, piezoelectric layer 38, and upper electrode layer 39) formed on the bonding surface of the vibrating plate 31 correspond to the structure. In this embodiment, it is the bump electrode 40 that has the highest height (highest projection from the bonding surface) among those components. As stated earlier, when the photosensitive adhesive agent 43 is applied so as to cover a structure having a certain height, the applied photosensitive adhesive agent 43 protrudes upward along the shape of the structure, so as to form a slope in the layer of the photosensitive adhesive agent 43 from the top portion toward a region where the structure is not provided (flat region). The photosensitive adhesive agent 43 is precured by heating, exposed, and developed so as to be patterned in a predetermined shape as will be subsequently described. Accordingly, when the photosensitive adhesive agent 43 is patterned at a position close to a relatively high structure such as the bump electrode 40 in the sealing plate 33, the slope remains in the photosensitive adhesive agent 43 after the patterning. The slope remaining in the photosensitive adhesive agent 43 often disables a sufficient adhesion area from being secured, thus resulting in defective adhesion. Besides, the exposure is prone to be uneven in a sloped portion compared with a flat portion. However, in the case where the photosensitive adhesive agent 43 is patterned in the sealing plate 33 so as to completely remove the slope, the photosensitive adhesive agent 43 is located distant from the bump electrode 40 and hence a space for the bump electrode 40 has to be secured. As a result, the electronic device 14 is disabled from being made smaller and finer in size. Here, the term "flat" refers to a state where the surface of the photosensitive adhesive agent 43 is completely parallel to the bonding surface of the substrate on which the photosensitive adhesive agent 43 is formed, as well as to a state where the surface of the photosensitive adhesive agent 43 is slightly inclined with respect to the substrate, to such an extent that does not affect the adhesion performance.

By the manufacturing method of the electronic device 14 according to the present invention, the maximum differences in height of the structures on the respective bonding surfaces are compared between the vibrating plate 31 and the sealing plate 33, and the photosensitive adhesive agent 43 is applied to the bonding surface of the substrate having the structure of the smaller difference in height, so as to minimize the foregoing problem. In other words, the photosensitive adhesive agent 43 is applied to the substrate that makes the distance of the slope from the top portion of the photosensitive adhesive agent 43 corresponding to the structure to the flat region (generally parallel to the bonding surface of the substrate) shorter, on the assumption that the photosensitive adhesive agent 43 is applied to both of the substrates so as to cover the respective structures. Here, the term "difference in height" refers to a height of the structure with respect to the bonding surface of the substrate (size in the direction perpendicular to the substrate).

Hereunder, description will be given on a manufacturing process of the electronic device 14, in particular a bonding process between the pressure chamber forming substrate 29 corresponding to the first substrate and having the piezoelectric element 32 and the vibrating plate 31 stacked thereon, and the sealing plate 33 corresponding to the second substrate. Here, the electronic device 14 according to this embodiment can be obtained by bonding together a silicon monocrystalline substrate including a plurality of regions to be formed into the sealing plate 33 and a silicon monocrystalline substrate including a plurality of regions where the vibrating plate 31 and the piezoelectric element 32 are stacked to be formed into the pressure chamber forming substrate 29, and cutting the bonded substrates into individual pieces.

FIGS. 4A to 4D are schematic cross-sectional views for explaining the manufacturing process of the electronic device 14, each illustrating the configuration in the vicinity of the bump electrode 40 and the photosensitive adhesive agent 43. First, the vibrating plate 31 is stacked on the surface of the pressure chamber forming substrate 29 (surface to be bonded to the sealing plate 33), and then the lower electrode layer 37, the piezoelectric layer 38, and the upper electrode layer 39 are sequentially stacked and patterned so as to form the piezoelectric element 32. At this point, a plurality of regions to be formed into the pressure chamber forming substrate 29 are formed on the silicon monocrystalline substrate. On the silicon monocrystalline substrate to be formed into the sealing plate 33, first the drive circuit 46 is formed on the surface to be bonded to the vibrating plate 31, through a semiconductor process. After the drive circuit 46 is formed, the internal resin 41 of the bump electrode 40 is formed on the bonding surface of the sealing plate 33. To be more detailed, a material resin (for example, polyimide resin) is applied in a predetermined thickness, and patterned into the internal resin 41 having the rib shape at predetermined positions, through prebaking, photolithography, and etching. After the internal resin 41 is formed, a metal to be formed into the wiring layer 47 and the conductive film 42 of the bump electrode 40 is deposited, and then photolithography and etching are performed so as to form the wiring layer 47 and the conductive film 42. Thus, a plurality of regions to be formed into the sealing plate 33 are formed on the silicon monocrystalline substrate.

Figure 4A:
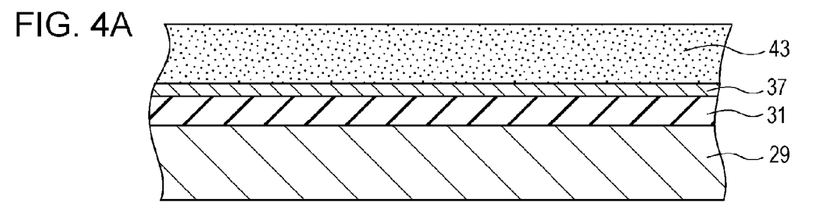
FIGS. 4A to 4D are schematic cross-sectional views for explaining a manufacturing process of an electronic device.

Then the photosensitive adhesive agent 43 is applied to one of the surface of the vibrating plate 31 (to be bonded to the sealing plate 33) stacked on the pressure chamber forming substrate 29, and the surface of the sealing plate 33 (to be bonded to the vibrating plate 31) (adhesive agent application process). As described above, the photosensitive adhesive agent 43 is applied to the substrate that makes the distance of the slope from the top portion of the photosensitive adhesive agent 43 corresponding to the structure to the flat region shorter, on the assumption that the photosensitive adhesive agent 43 is applied to both of the substrates so as to cover the respective structures. In other words, comparison is made between the maximum difference in height of the structure on the bonding surface of the vibrating plate 31 and the maximum difference in height of the structure on the bonding surface of the sealing plate 33, and the photosensitive adhesive agent 43 is applied to the bonding surface of the substrate having the structure of the smaller difference in height. As shown in FIG. 3, in this embodiment the difference in height D1 of the structure on the bonding surface of the vibrating plate 31 is largest at the driving region of the piezoelectric element 32. On the bonding surface of the sealing plate 33, the difference in height D2 of the structure is largest at the bump electrode 40. Through comparison therebetween, D1 is smaller than D2. In this embodiment, therefore, the photosensitive adhesive agent 43 is applied to the surface of the pressure chamber forming substrate 29 and the vibrating plate 31 (surface to be bonded to the sealing plate 33) so as to cover the structure such as the piezoelectric element 32, as shown in FIG. 4A. More specifically, the photosensitive adhesive agent 43 of a gel state or liquid state is applied to the vibrating plate 31 by spin coating.

Figure 4B:
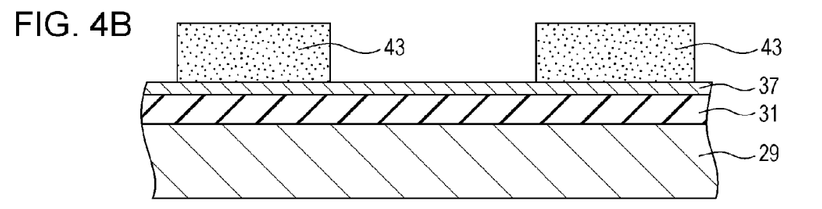

After the photosensitive adhesive agent 43 is applied, the adhesive agent 43 is exposed to light and precured by heating (precuring process). The hardness of the precured photosensitive adhesive agent 43 may be adjusted by the light amount of the exposure or the temperature of the heating. Then the photosensitive adhesive agent 43 is developed and patterned, in the precured state, into a predetermined shape and at predetermined positions, as shown in FIG. 4B (patterning process). In this embodiment, the photosensitive adhesive agent 43 is patterned in a bank shape extending in the direction of the nozzle row, on the respective sides of the region where the bump electrode 40 is to be located, in the longitudinal direction of the pressure chamber (orthogonal to the direction of nozzle row).

Figure 4C:
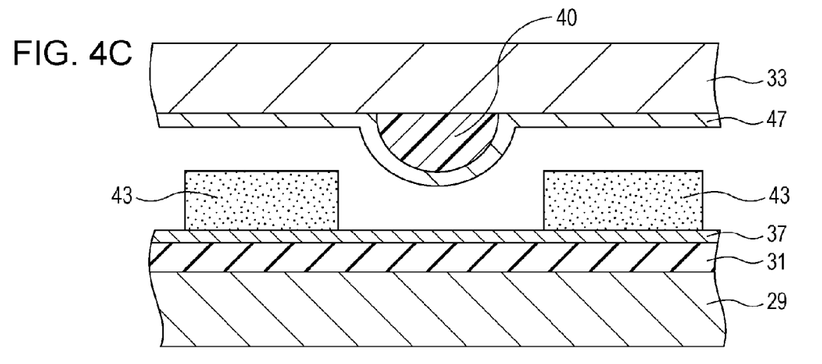
Figure 4D:
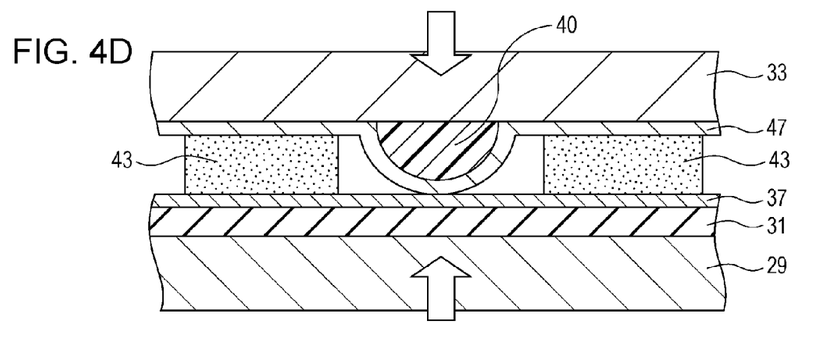

After the photosensitive adhesive agent 43 is patterned, the silicon monocrystalline substrates are bonded together (bonding process). To be more detailed, the silicon monocrystalline substrates are aligned with each other, and one of the silicon monocrystalline substrates is moved relative to the other, so as to bond the silicon monocrystalline substrates to each other, with the structures such as the bump electrode 40 and the piezoelectric element 32, and the photosensitive adhesive agent 43 interposed therebetween, as shown in FIG. 4C. At this point, the bump electrode 40 is located in the region between the pair of photosensitive adhesive agents 43. Further, the silicon monocrystalline substrates are pressed toward each other from the upper and lower directions, against the elastic restoring force of the bump electrode 40 and the photosensitive adhesive agent 43, and heated to the curing temperature of the photosensitive adhesive agent 43 with the pressure maintained. As result, the substrates are bonded together via the photosensitive adhesive agent 43, with the bump electrode 40 electrically connected to the lower electrode layer 37 and the upper electrode layer 39 in the non-driving region, as shown in FIG. 4D.

After the silicon monocrystalline substrates are bonded together, the silicon monocrystalline substrate constituting the pressure chamber forming substrate 29 is subjected to lapping, photolithography, and etching, so as to form the pressure chamber 30. Finally the silicon monocrystalline substrates are cut along predetermined scribe lines into individually separated electronic devices 14. Although the pair of silicon monocrystalline substrates are cut after being bonded together in this embodiment, different methods may be adopted. For example, the sealing plates and the pressure chamber forming substrates may be cut into individual pieces first, and then bonded together.

The electronic device 14 manufactured through the foregoing process is then fixed in position on the flow path unit 15 (communicating substrate 24) via an adhesive agent or the like. Then upon joining the head case 16 and the flow path unit 15 with the electronic device 14 located in the accommodation cavity 17 of the head case 16, the recording head 3 can be obtained.

As described thus far, the photosensitive adhesive agent 43 is applied to the substrate (surface of the vibrating plate 31 stacked on the pressure chamber forming substrate 29) that makes the distance of the slope from the top portion of the photosensitive adhesive agent 43 corresponding to the structure to the flat region shorter, on the assumption that the photosensitive adhesive agent 43 is applied to the substrates so as to cover the respective structures. Accordingly, the slope is suppressed from being formed on the surface of the photosensitive adhesive agent 43, or can only be formed in a smaller size compared with the slope that may appear when the photosensitive adhesive agent 43 is applied to the substrate having the bump electrode 40. Therefore, since the photosensitive adhesive agent 43 can be provided at a position as close as possible to the region where the structure such as the bump electrode 40 is to be located, a higher degree of designing freedom can be attained so as arrange the bump electrode 40 and the photosensitive adhesive agent 43 in a higher density. Consequently, the electronic device 14 can be manufactured in a smaller size. In addition, the size of each electronic device 14 in the silicon monocrystalline substrate is reduced, and hence an increased number of chips can be obtained from the silicon monocrystalline substrate. Therefore, the cost per electronic device 14 can also be reduced. Further, the bonding reliability of the photosensitive adhesive agent 43 is improved and therefore the quality of the electronic device 14 is stabilized, which leads to a higher yield. Still further, the formation of the slope on the surface of the adhesive agent is suppressed even in a region where the structure having the maximum difference in height (in this embodiment, bump electrode 40) is to be located. Accordingly, the photosensitive adhesive agent 43 can be located as close as possible to the position where the bump electrode 40, the highest structure, is to be provided, and therefore an even higher degree of designing freedom can be attained, and a further reduction in size can be expected. Further, by adopting the foregoing manufacturing method, the electronic device that is smaller in size and higher in reliability can be obtained.

Figure 5:
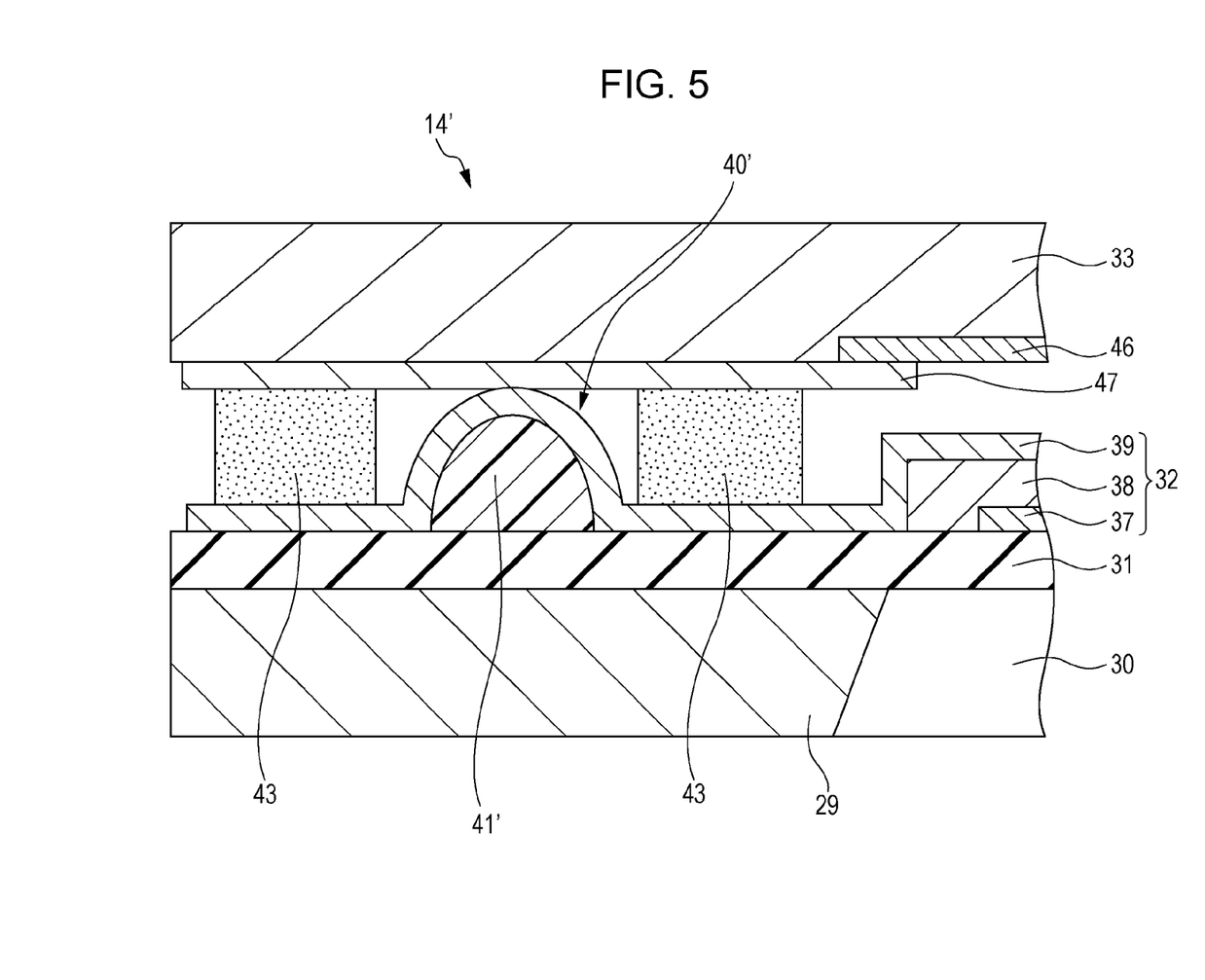
FIG. 5 is an enlarged cross-sectional view of an essential portion of an electronic device according to a second embodiment.

Although the bump electrode 40 is provided on the side of the sealing plate 33 in the foregoing embodiment, different configurations may be adopted. In an electronic device 14' according to a second embodiment shown in FIG. 5, a bump electrode 40' is provided on the side of the vibrating plate 31. To be more detailed, an internal resin 41' of the bump electrode 40' is patterned on the vibrating plate 31 before the piezoelectric element 32 is formed, and the upper electrode layer 39 and the lower electrode layer 37 are deposited and patterned on the vibrating plate 31 and the internal resin 41' in the formation process of the piezoelectric element 32, so as to form the bump electrode 40'. In this case, the photosensitive resin 43 is applied to the bonding surface of the sealing plate 33, in the adhesive agent application process. The configuration of the remaining portion is the same as that of the foregoing embodiment, and therefore the description will not be repeated.

Although the liquid ejecting head is exemplified by the ink jet recording head mounted in the ink jet printer in the foregoing embodiments, the present invention is also applicable to those that eject a liquid other than the ink. For example, the present invention is applicable to a color material ejecting head used for manufacturing color filters of liquid crystal displays, an electrode material ejecting head used for manufacturing electrodes for organic electro luminescence (EL) displays and field emission displays (FED), and a bioorganic substance ejecting head used for manufacturing biochips.

Further, the present invention is also applicable, for example, to an electronic device employed in various sensors, without limitation to the use as actuator in the liquid ejecting head.

What is claimed is:

1. A manufacturing method of an electronic device that includes a first substrate including a flexurally deformable driving region and a drive element disposed in the driving region so as to deform the driving region, and a second substrate opposed to the first substrate with a spacing from the first substrate and with the drive element and other structure of the first substrate interposed between the first and second substrates, the first and second substrates being bonded together via a thermosetting adhesive agent, the manufacturing method comprising:
   applying the adhesive agent to a bonding surface of one of the first substrate and the second substrate that, on an assumption that the adhesive agent is applied to the both substrates so as to cover a structure formed on the respective bonding surfaces, makes a distance of a slope from a top portion of the adhesive agent covering the structure to an edge of a flat region of the adhesive agent shorter;
   bonding the first substrate and the second substrate together, with the structure and the adhesive agent interposed between the first and second substrates; and
   a patterning process including providing the adhesive agent on respective sides of a region where a structure having a highest height between the first substrate and the second substrate is located.

2. An electronic device manufactured through the manufacturing method according to claim 1.

\* \* \* \* \*